(12) United States Patent
Taravade

(10) Patent No.: US 6,970,622 B1
(45) Date of Patent: Nov. 29, 2005

(54) ARRANGEMENT AND METHOD FOR CONTROLLING THE TRANSMISSION OF A LIGHT SIGNAL BASED ON INTENSITY OF A RECEIVED LIGHT SIGNAL

(75) Inventor: Kunal N. Taravade, Portland, OR (US)

(73) Assignee: LSI Logic Corporation, Milpitas, CA (US)

( * ) Notice: Subject to any disclaimer, the term of this patent is extended or adjusted under 35 U.S.C. 154(b) by 253 days.

(21) Appl. No.: 09/909,175

(22) Filed: Jul. 19, 2001

(51) Int. Cl.[7] .............................. G02B 6/26; G02B 6/42
(52) U.S. Cl. .............................. 385/39; 385/5; 385/140
(58) Field of Search .............................. 385/5, 38, 122, 385/140, 39, 49

(56) References Cited

U.S. PATENT DOCUMENTS

| | | | | |
|---|---|---|---|---|
| 4,515,429 A | * | 5/1985 | Smith et al. | 385/4 |
| 4,952,016 A | * | 8/1990 | Adams et al. | 385/131 |
| 4,973,125 A | * | 11/1990 | Normandin | 385/27 |
| 5,202,786 A | * | 4/1993 | Boyle et al. | 359/243 |
| 5,348,688 A | * | 9/1994 | Sharp et al. | 252/582 |
| 5,561,541 A | | 10/1996 | Sharp et al. | 359/66 |
| 5,900,983 A | * | 5/1999 | Ford et al. | 359/627 |

* cited by examiner

*Primary Examiner*—Akm Enayet Ullah
*Assistant Examiner*—Kevin S. Wood
(74) *Attorney, Agent, or Firm*—Maginot, Moore & Beck

(57) ABSTRACT

An arrangement for controlling the transmission of a light signal is disclosed. The arrangement includes a first fiber optic line for transmitting the light signal and a light receiving unit operatively coupled to the first fiber optic line so that the light signal is received by the light receiving unit. The light receiving unit is operative to refract the light signal so that the light signal is substantially prevented from being transmitted through the light receiving unit if an intensity level of the light signal has a predetermined relationship with an intensity threshold level.

21 Claims, 1 Drawing Sheet

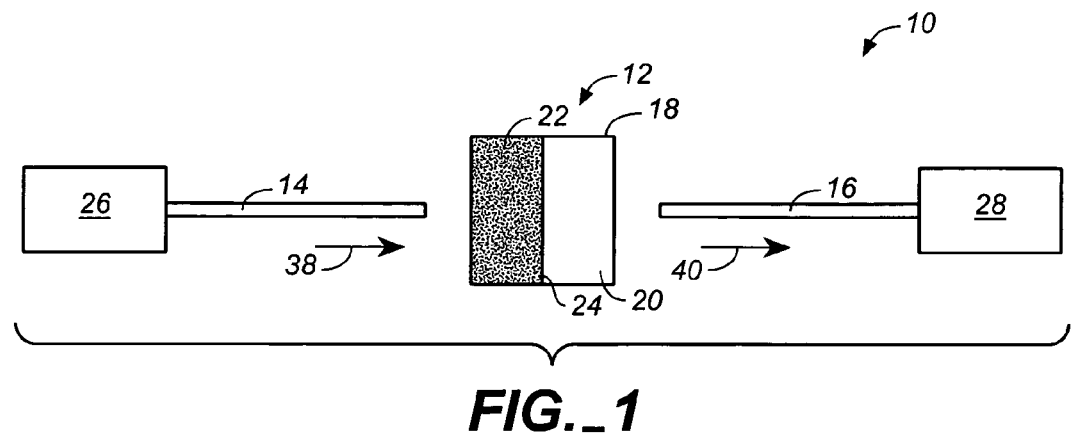
FIG._1
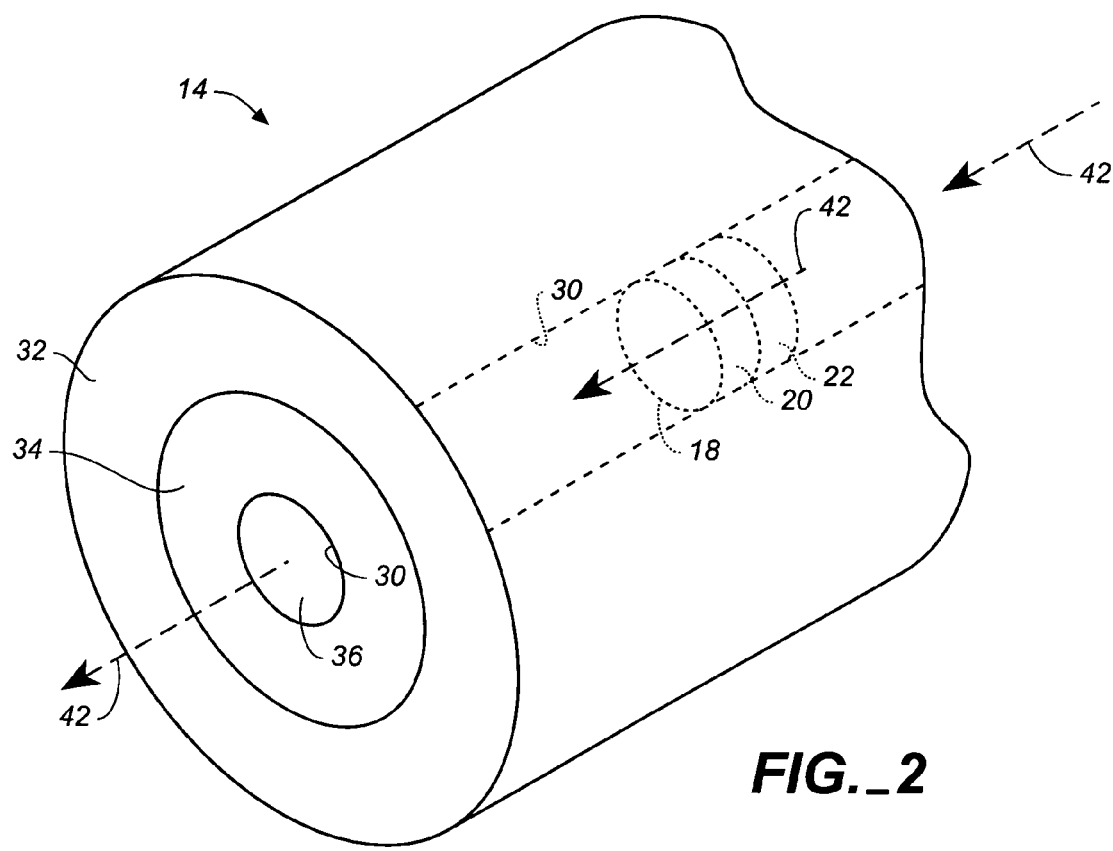
FIG._2

# ARRANGEMENT AND METHOD FOR CONTROLLING THE TRANSMISSION OF A LIGHT SIGNAL BASED ON INTENSITY OF A RECEIVED LIGHT SIGNAL

TECHNICAL FIELD OF THE INVENTION

The present invention relates generally to an arrangement and method for controlling the transmission of a light signal, and more particularly to an arrangement and method for controlling the transmission of a light signal in an optical communication system.

BACKGROUND OF THE INVENTION

Optical communication systems utilize light signals to carry information to various locations within the system. In order to ensure that the appropriate information is carried to the appropriate location within the communication system the light signal needs to be controlled in an efficient and dependable manner. One mechanism utilized to control light signals in an optical communication system employs optical switches and gates. For example, one type of optical switch is known as a micro-electro-mechanical system (MEMS). MEMS consist of extremely small mirrors arranged on special pivots so that the mirrors can be moved in three dimensions. While a MEMS type optical switch can function to control light signals in an optical communication system, this optical switch suffers from a draw back shared by several other prior art optical switches. In particular, these prior art optical switches and gates are complicated and thus expensive and difficult to fabricate.

Thus, a continuing need exists for an arrangement and method for controlling the transmission of a light signal which is relatively simple and inexpensive to fabricate.

SUMMARY OF THE INVENTION

In accordance with one embodiment of the present invention, there is provided a method of controlling the transmission of a light signal. The method includes (a) transmitting the light signal through a first fiber optic line and (b) receiving the light signal with a light receiving unit operatively coupled to the first fiber optic line. The light receiving unit is operative to refract the light signal so that the light signal is substantially prevented from being transmitted through the light receiving unit if an intensity level of the light signal has a predetermined relationship with an intensity threshold level.

Pursuant to another embodiment of the present invention, there is provided an arrangement for controlling the transmission of a light signal. The arrangement includes a first fiber optic line for transmitting the light signal and a light receiving unit operatively coupled to the first fiber optic line so that the light signal is received by the light receiving unit. The light receiving unit is operative to refract the light signal so that the light signal is substantially prevented from being transmitted through the light receiving unit if an intensity level of the light signal has a predetermined relationship with an intensity threshold level.

Pursuant to yet another embodiment of the present invention, there is provided an optical switch arrangement for controlling the transmission of a light signal. The arrangement includes a first fiber optic line for transmitting the light signal and a light receiving unit operatively coupled to the first fiber optic line so that the light signal is received by the light receiving unit. The light receiving unit includes a first optical material and a second optical material having an interface therebetween. The first optical material has a linear index of refraction. The second optical material has a nonlinear index of refraction which is dependent on an intensity level of the light signal received with the light receiving unit. The light signal is refracted at the interface such that the light signal is substantially prevented from being transmitted through the light receiving unit if the linear index of refraction of the first optical material does not match the nonlinear index of refraction of the second optical material.

Pursuant to still another embodiment of the present invention, there is provided an optical communications system for transmitting information. The optical communications system includes an optical switch arrangement for controlling transmission of a light signal. The optical switch arrangement includes (i) a first fiber optic line for transmitting the light signal and (ii) a light receiving unit operatively coupled to the first fiber optic line so that the light signal is received by the light receiving unit. The light receiving unit includes a first optical material and a second optical material having an interface therebetween. The first optical material has a linear index of refraction. The second optical material has a nonlinear index of refraction which is dependent on an intensity level of the light signal received with the light receiving unit. The light signal is refracted at the interface such that the light signal is substantially prevented from being transmitted through the light receiving unit if the linear index of refraction of the first optical material does not match the nonlinear index of refraction of the second optical material.

It is an object of the present invention to provide a new and useful method and arrangement for controlling the transmission of a light signal.

It is an object of the present invention to provide an improved method and arrangement for controlling the transmission of a light signal.

It further the object of the present invention to provide a method and arrangement for controlling the transmission of a light signal which less expensive and complicated to fabricate.

The above and other objects, features, and advantages of the present invention will become apparent from the following description and the attached drawings.

BRIEF DESCRIPTION OF THE DRAWINGS

FIG. 1 is a schematic representation of an optical communication system which incorporates features of the present invention therein; and FIG. 2 is a cross sectional fragmentary view of a fiber optic line of the optical communication system of FIG. 1.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1 there is shown an exemplary optical communication system 10 which incorporates various features of the present invention therein. Optical communication system 10 includes an optical switch or gate arrangement 12, a fiber optic line 14, a fiber optic line 16, an electrooptical converter 26, and an electrooptical converter 28.

Optical switch arrangement 12 includes a light receiving unit 18. Light receiving unit 18 includes a first or linear optical material 20 and a second or nonlinear optical material 22. The linear optical material 20 and the nonlinear optical material 22 have a planar interface 24 therebetween.

The linear optical material 20 has a linear index of refraction, whereas the nonlinear optical material 22 has a nonlinear index of refraction. In particular, the index of refraction of the linear optical material 20 remains constant irrespective of the intensity level of a light signal passing therethrough. Hence, as the intensity level of light signals received by light receiving unit 18 varies, the index of refraction of the linear optical material 20 remains constant. Suitable optical materials for use as the linear optical material 20 of the present invention include glass or quartz.

The index of refraction of the nonlinear optical material 22 varies based on the intensity level of the light signal passing therethrough. In particular, if the intensity level of the light signal passing through the nonlinear optical material 22 is below a predetermined intensity threshold value, the index of refraction of the nonlinear optical material 22 remains constant. However, if the intensity level of the light signal passing through the nonlinear optical material 22 is above the intensity threshold value, the index of refraction of the nonlinear optical material 22 changes. Hence, if the intensity level of the light signal received by light receiving unit 18 is below the intensity threshold value, the index of refraction of the nonlinear optical material 22 remains constant. However, if the intensity level of the light signal received by the light receiving unit 18 is equal to or above the threshold value, the index of refraction of the nonlinear optical material 22 changes. Suitable optical materials having nonlinear indices of refraction for use as the nonlinear optical material 22 of the present invention are the nonlinear optical materials disclosed in U.S. Pat. No. 5,561,541 entitled "Frustrated Total Internal Reflection Optical Power Limiter" which was issued on Oct. 1, 1996 to Sharp et al, the disclosure of which is hereby incorporated by reference. For example, nonlinear optical materials which can be used in the present invention include MBBA which has the name N-(p-methoxybenzylidene)-p-butylaniline, MEBBA which has the following structure

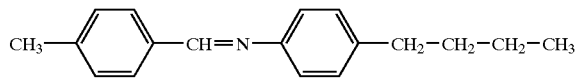

PePMeOB which has the following structure

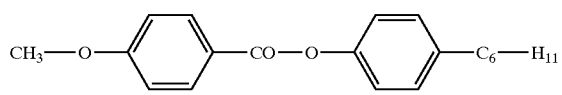

and BuPPeB which has the following structure

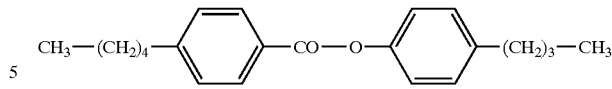

The nonlinear optical material 22 preferably has an index of refraction which matches the index of refraction of the linear optical material 20 when the intensity level of the light signal passing therethrough is below the intensity threshold level. What is meant herein by the terms "match" or "matches" is that the index of refraction of a first optical material is either equal to, or within a predetermined tolerance range of, the index of refraction of a second optical material so that a light signal can pass through light receiving unit 18. In particular, it should be appreciated that if the index of refraction of the linear optical material 20 matches the index of refraction of the nonlinear optical material 22, light signal passing therethrough is unattenuated by the optical materials 20, 22. However, if the index of refraction of the linear optical material 20 does not match the index of refraction of the nonlinear optical material 22, the light signal passing therethrough is refracted at the planar interface 24 between the optical materials 20, 22. What is meant herein by the terms "refract", "refracts", "refracted", "refracting", or "refraction" is the bending or redirecting of the light signal passing through the optical materials 20, 22 such that light signal is substantially prevented from passing all the way through light receiving unit 18. As shall be discussed below in greater detail, such refraction of the light signal passing through the optical materials 20, 22 substantially prevents the light signal from being received by, and propagated through, fiber optic line 16.

Each fiber optic cable 14 and 16 is substantially identical and thus only fiber optic cable 14 will be discussed in detail herein. As shown in FIG. 2, fiber optic cable 14 includes a core 36 surrounded by cladding 34, which in turn is surrounded by a coating 32. Core 36 is made of substantially pure silica. Cladding 34 is a glass which serves to guide a light signal in the core 36 and allow as little as possible to leave through the sides of fiber optic cable 14. The coating 32 is typically a polymer layer which just makes it easier to handle the fiber. Fiber optic cables like fiber optic cable 14 are well known and commercially available.

Now referring back to FIG. 1, electrooptical converters 26 and 28 are operative to convert electrical signals to optical signals (i.e. light signals) and optical signals back into electrical signals, respectively. Electrooptical converters like 26 and 28 are well known and commercially available.

Still referring to FIG. 1, electrooptical converter 26 is operatively coupled to fiber optic line 14 such that electrooptical converter 26 can generate and transmit light signals through fiber optic line 14 in the direction indicated by arrow 38. Light receiving unit 18 is operatively coupled to fiber optic line 14 so that light receiving unit 18 receives the light signal emanating from fiber optic line 14. As previously discussed, if the intensity level of the light signal received by the light receiving unit 18 is equal to or above the threshold value, the index of refraction of the nonlinear optical material 22 changes. Accordingly, the index of refraction of the linear optical material 20 does not match the index of refraction of the nonlinear optical material 22, therefore the light signal being received by light receiving unit 18 is refracted at the planar interface 24 between the optical materials 20, 22. As such, the light signal being received by light receiving unit 18 does not pass therethrough, and thus is stopped from being further transmitted in optical communications system 10 while the intensity of the light signal is equal to or above the threshold value. (Note that when the light signal is refracted at the planar interface 24 and does not pass through light receiving unit 18, this condition is analogous to "logic 1", i.e. where the optical switch arrangement 12 is "off" and not transmissive; Further note that the light signal could be modulated so as to decrease the intensity thereof so that the intensity is below the threshold level and, as discussed below, further transmitted in optical communications system 10.)

However, if the intensity level of the light signal received by the light receiving unit 18 is below the threshold value, the index of refraction of the nonlinear optical material 22 remains the same. Accordingly, the index of refraction of the linear optical material 20 matches the index of refraction of the nonlinear optical material 22, and therefore the light signal being received by light receiving unit 18 passes therethrough. (Note that when the light signal passes through the light receiving unit 18 this condition is analogous to "logic 0", i.e. where the optical switch arrangement 12 is "on" and fully transmissive.) As such, the light signal exits light receiving unit 18 and is further transmitted in optical communications system 10. In particular, fiber optic cable 16 is operatively coupled to light receiving unit 18 so that the light signal passing through light receiving 18 is further transmitted through fiber optic cable 16 in the direction indicated by arrow 40. The light signal transmitted through fiber optic cable 16 is then received by electrooptical converter 28 which is operatively coupled to fiber optic cable 16. Electrooptical converter 28 can then convert the light signal into an electrical signal, and the resultant electrical signal can be processed by, for example, an integrated circuit device (not shown) of optical communications system 10.

It should be understood that while FIG. 1 illustrates light receiving unit 18 being exterior to fiber optic cables 14 and 16, it is contemplated that light receiving unit 18 could be positioned within a fiber optic cable. For example, as shown in FIG. 2, light receiving unit 18 can be positioned within a lumen 30 defined by fiber optic cable 14 and still function as described above as a light signal travels through lumen 30 in the direction indicated by arrows 42.

In light of the above discussion it should be appreciated that the optical switch (gate) arrangement 12 of the present invention is relatively simple and inexpensive to fabricate as compared to other prior art switch (gate) arrangements.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected.

What is claimed is:

1. A method of controlling the transmission of a light signal, comprising:
    (a) transmitting said light signal through a first fiber optic line; and
    (b) receiving said light signal with a light receiving unit operatively coupled to said first fiber optic line, said light receiving unit being operative to refract said light signal so that said light signal is substantially prevented from being transmitted through said light receiving unit if an intensity level of said light signal has a predetermined relationship with an intensity threshold level, such that when the intensity level of the received light signal is on one side of the intensity threshold level, the light signal is substantially prevented from being transmitted, and when the intensity level of the received light signal is on an opposite side of the intensity threshold level, the light signal is substantially permitted to be transmitted, there being a substantial change in the amount of the received light signal that is transmitted as the intensity level of the received light signal passes through the intensity threshold level.

2. The method of claim 1, further comprising:
    (c) generating said light signal with an electrooptical converter operatively coupled to said first fiber optic line.

3. The method of claim 1, further comprising:
    (d) transmitting said light signal through a second fiber optic line which is operatively coupled to said light receiving unit if said light receiving unit does not refract said light signal.

4. The method of claim 3, further comprising:
    (e) receiving said light signal with an electrooptical converter operatively coupled to said second fiber optic line.

5. The method of claim 1, wherein:
    (b) includes raising said intensity level of said light signal so that said intensity level of said light signal is greater than said intensity threshold level and said light receiving unit refracts said light signal so as to substantially prevent said light signal from being transmitted through said light receiving unit.

6. The method of claim 1, wherein:
    said light receiving unit includes a first optical material and a second optical material having an interface therebetween,
    said first optical material has a linear index of refraction,
    said second optical material has a nonlinear index of refraction which is dependent on said intensity level of said light signal, and
    (b) includes refracting said light signal at said interface if said linear index of refraction of said first optical material does not match said nonlinear index of refraction of said second optical material.

7. The method of claim 5, wherein:
    (b) also includes lowering said intensity level of said light signal so that said intensity level of said light signal is less than said intensity threshold level and said light receiving unit does not refract said light signal such that said light signal is transmitted through said light receiving unit.

8. An arrangement for controlling the transmission of a light signal, comprising:
    a first fiber optic line for transmitting said light signal; and
    a light receiving unit operatively coupled to said first fiber optic line so that said light signal is received by said light receiving unit, said light receiving unit being operative to refract said light signal so that said light signal is substantially prevented from being transmitted through said light receiving unit if an intensity level of said light signal has a predetermined relationship with an intensity threshold level, such that when the intensity level of the received light signal is on one side of the intensity threshold level, the light signal is substantially prevented from being transmitted, and when the intensity level of the received light signal is on an opposite side of the intensity threshold level, the light signal is substantially permitted to be transmitted, there being a substantial change in the amount of the received light signal that is transmitted as the intensity level of the received light signal passes through the intensity threshold level.

9. The arrangement of claim 8, further comprising:
an electrooptical converter operatively coupled to said first fiber optic line, wherein said electrooptical converter generates said light signal such that said light signal is transmitted through said first fiber optic line.

10. The arrangement of claim 8, further comprising:
a second fiber optic line operatively coupled to said light receiving unit such that if said light receiving unit does not refract said light signal said light signal is transmitted through said second fiber optic line.

11. The arrangement of claim 10, further comprising:
an electrooptical converter operatively coupled to said second fiber optic line such that said electrooptical converter receives said light signal if said light receiving unit does not refract said light signal.

12. The arrangement of claim 8, wherein:
said light receiving unit includes a first optical material and a second optical material having an interface therebetween,
said first optical material has a linear index of refraction,
said second optical material has a nonlinear index of refraction which is dependent on said intensity level of said light signal received with said light receiving unit, and
said light signal is refracted at said interface if said linear index of refraction of said first optical material does not match said nonlinear index of refraction of said second optical material.

13. An optical switch arrangement for controlling the transmission of a light signal, comprising:
a first fiber optic line for transmitting said light signal; and
a light receiving unit operatively coupled to said first fiber optic line so that said light signal is received by said light receiving unit, wherein (i) said light receiving unit includes a first optical material and a second optical material having an interface therebetween, (ii) said first optical material has a linear index of refraction, (iii) said second optical material has a nonlinear index of refraction which is dependent on an intensity level of said light signal received with said light receiving unit, and (iv) said light signal is refracted at said interface such that said light signal is substantially prevented from being transmitted through said light receiving unit if said linear index of refraction of said first optical material does not match said nonlinear index of refraction of said second optical material.

14. The arrangement of claim 13, further comprising:
an electrooptical converter operatively coupled to said first fiber optic line, wherein said electrooptical converter generates said light signal such that said light signal is transmitted through said first fiber optic line.

15. The arrangement of claim 13, further comprising:
a second fiber optic line operatively coupled to said light receiving unit such that if said light receiving unit does not refract said light signal said light signal is transmitted through said second fiber optic line.

16. The arrangement of claim 15, further comprising:
an electrooptical converter operatively coupled to said second fiber optic line such that said electrooptical converter receives said light signal if said light receiving unit does not refract said light signal.

17. The arrangement of claim 13, wherein:
said light receiving unit refracts said light signal so as to substantially prevent said light signal from being transmitted through said light receiving unit when said intensity level of said light signal is greater than said intensity threshold level.

18. The arrangement of claim 13, wherein:
said light receiving unit is positioned within a lumen defined by said first fiber optic line.

19. The arrangement of claim 13, wherein:
said first optical material includes quartz.

20. The arrangement of claim 13 wherein:
said second optical material includes a material selected from the group of materials consisting of MBBA, MEBBA, PePmeOB, and BuPPeB.

21. An optical communications system for transmitting information, comprising:
an optical switch arrangement for controlling transmission of a light signal, wherein said optical switch arrangement includes (i) a fiber optic line for transmitting said light signal and (ii) a light receiving unit operatively coupled to said fiber optic line so that said light signal is received by said light receiving unit, wherein (A) said light receiving unit includes a first optical material and a second optical material having an interface therebetween, (B) said first optical material has a linear index of refraction, (C) said second optical material has a nonlinear index of refraction which is dependent on an intensity level of said light signal received with said light receiving unit, and (D) said light signal is refracted at said interface such that said light signal is substantially prevented from being transmitted through said light receiving unit if said linear index of refraction of said first optical material does not match said nonlinear index of refraction of said second optical material.

* * * * *